April 28, 1942. E. D. TREANOR Re. 22,086

BUSHING

Original Filed May 1, 1940

Inventor:
Edward D. Treanor,
by Harry E. Dunham
His Attorney.

Reissued Apr. 28, 1942 Re. 22,086

UNITED STATES PATENT OFFICE 22,086

BUSHING

Edward D. Treanor, Pittsfield, Mass., assignor to General Electric Company, a corporation of New York Original No. 2,264,816, dated December 2, 1941. Serial No. 332,750, May 1, 1940. Application for reissue January 27, 1942, Serial No. 428,410

3 Claims. (Cl. 174—152)

The present invention relates to bushings for leading an electrical conductor through an enclosure wall and while it is not necessarily limited thereto, it is particularly applicable to enclosed transformers of the outdoor mounting type.

Certain forms of enclosed electrical apparatus such as oil filled transformers are provided with bushings for leading the conductors through the tank walls and, in order to effect a liquid tight seal between the bushings and the tank walls, a gasket is provided between a shoulder on each bushing and the adjacent tank wall around the opening therethrough. With the usual means provided for clamping the bushing to the tank, the edges of the gaskets are exposed to fume laden atmospheres or weather, depending upon the location of the transformer and are gradually deteriorated to such an extent that water and other foreign substances are permitted to seep therethrough into the interior of the tank. Contamination of the liquid within the tank seriously impairs its insulating quality and facilities the ultimate breakdown of the transformer itself. It is therefore an object of this invention to provide a new and improved bushing and liquid tight clamping arrangement therefor which is substantially weatherproof, simple in design, and low in manufacturing cost.

Figure 1:
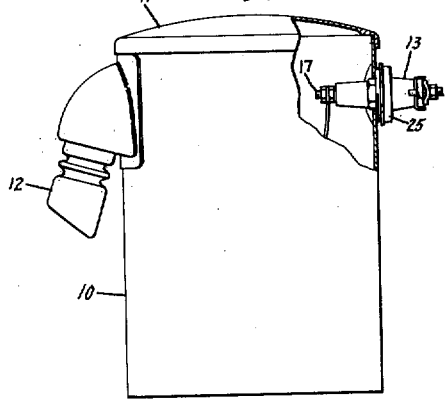
Figure 2:
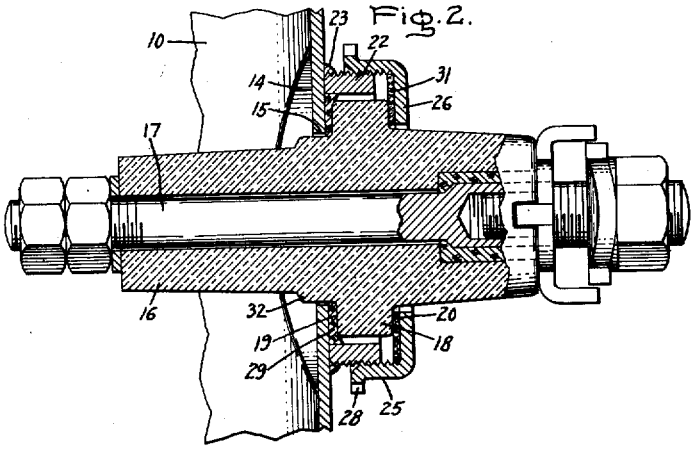
Figure 3:
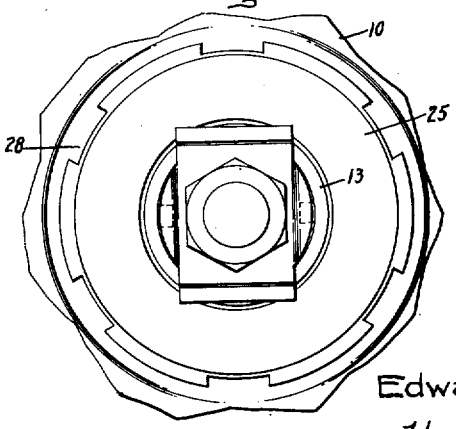

Further objects and advantages of the invention will appear from the following description and the claims appended thereto taken in connection with the accompanying drawing in which Fig. 1 is a view partly in section of an enclosed electrical transformer embodying a bushing assembly constructed in accordance with the invention; Fig. 2 is a cross sectional view of the bushing assembly; and Fig. 3 is a front view thereof.

Referring to the drawing, the invention will be described as it may be applied to an electrical transformer comprising a cylindrical housing or tank 10 provided with a cover 11 and having high and low voltage lead-in bushings 12 and 13, respectively, extending through the tank wall, the low voltage bushings being constructed in accordance with the invention. As illustrated more clearly in Fig. 2, a portion of the cylindrical tank wall is flattened, as indicated at 14, about each low voltage bushing the flattened wall portion being provided with a centrally arranged opening 15 through which the bushing extends. The bushing comprises a longitudinal, single piece insulator 16 having a conductor 17 extending axially therethrough and provided with suitable terminal structures at opposite ends. The insulator 16 is provided with an annular flange 18 having a diameter somewhat greater than the cross section of the opening 15 and a pair of opposed shoulders 19 and 20, the surfaces of which lie in substantially parallel planes at right angles with the axis of the insulator. A cylindrical ring 22 having an inner diameter slightly larger than the diameter of the annular flange 18 of the insulator is welded as at 23 to the flattened portion 14 of the tank wall concentrically with the opening 15 and the insulator flange. The outer surface of the ring 22 is threaded for cooperatively receiving a clamping nut 25 which nut is provided with an annular flange 26 extending inwardly over the shoulder 20 of the insulator flange. The height of the ring 22 is somewhat less than that of the insulator flange 18 so that the clamping nut flange 26 will not engage with the outer end of ring 22 as the nut is tightened. The clamping nut 25 is provided with a plurality of notches 28 about its circumference for cooperatively receiving a suitable wrench. A relatively thick gasket 29 of a suitable compressible material, such as cork, is provided within the ring 22 between the tank wall and the shoulder 19 of the insulator flange, the gasket 29 having a portion extending into the clearance space between the flange and ring, and a fiber washer 31 is arranged between the flanged portion 26 of the clamping nut 25 and the insulator flange shoulder 20. As the clamping nut 25 is screwed onto the ring 22 the gasket 29 is compressed effecting a substantially gas and liquid tight seal around the opening 15. To prevent turning of the insulator as the nut is tightened, the opening 15 in the tank wall and the adjacent insulator portion 32 are preferably of a hexagonal configuration, though any other keying arrangement may be used if desired.

It will be appreciated that the ring 22 need not be welded to the tank wall in a gas tight manner since the space between the tank wall and the bushing insulator is sealed by means of the gasket 29. Any slight cracks which may exist between the welds 23 will be effectively sealed by the coating of paint normally applied to the outer surface of the transformer tank to prevent entrance of moisture therethrough to the gasket edges. It will be apparent therefore that the gasket 29 is effecively enclosed by the ring 22 and nut 25 and protected against deterioration by exposure. Since the clamping nut is on the exterior of the tank, it can be readily tightened without dismantling the transformer or even disconnecting it from the line.

While in the illustrated embodiment I have described the bushing assembly as applied to a transformer housing, it is obvious that its use is by no means limited thereto and it is equally applicable in any instance where it is desired to effect an electrical connection through an enclosing housing for any type of electrical apparatus.

Having described my invention in what I consider to represent a preferred embodiment thereof, I desire to have it understood that the specific details shown are merely illustrative and that the invention may be carried out by other means.

What I claim as new and desire to secure by Letters Patent of the United States is:

1. The combination with a tank having an opening in a wall thereof, of means for electrical connection between the inside and outside of said tank comprising an integral insulating bushing extending through said opening, said bushing having an annular flange of a diameter greater than the cross section of said opening, an externally threaded ring welded to the outer surface of said tank wall about said bushing flange, said ring having an inner dimension greater than the outer dimension of said flange so that there is a clearance therebetween, a compressible gasket arranged within said ring about said wall opening and beneath said bushing flange and having a portion extending into the clearance space between said flange and said ring, and an annular clamping nut threaded for cooperatively screwing onto said ring and having an inwardly extending annular flange for engaging with said bushing flange so as to tightly compress said gasket between said bushing flange and said tank wall for providing a substantially liquid-tight seal, said clamping nut substantially enclosing said compressible gasket for protecting said gasket from the weather.

2. The combination of a housing having an opening in a wall thereof, of means for electrical connection between the inside and outside of said housing comprising an integral insulating bushing having an annular flange with a diameter greater than that of said opening, a compressible gasket between said flange and said wall, an externally threaded ring welded to said wall about said opening and extending outwardly a distance less than the height of said flange, said ring having an inner dimension greater than the outer dimension of said flange so that there is a clearance therebetween, and an annular clamping nut threaded for cooperatively screwing onto said ring and having an inwardly extending annular flange for engaging with said bushing flange and securing said gasket tightly between the outer surface of said wall and the inner surface of said flange to make a substantially liquid-tight seal, said inwardly extending flange providing an enclosing housing for protecting said gasket from the weather.

3. The combination of a housing having an opening in a wall thereof, of means for electrical connection between the inside and outside of said housing comprising an integral insulating bushing having an annular flange with inner and outer surfaces substantially parallel with the outer surface of said wall and with a diameter greater then that of said opening, an externally threaded ring welded to said wall about said opening and extending outwardly a distance less than the height of said flange, an annular clamping nut threaded for cooperatively screwing onto said ring and having an inwardly extending annular flange for cooperating with the outer surface of said bushing flange, a compressible gasket arranged within said ring about said wall opening and beneath said bushing flange cooperating with said inner surface of said flange and the outer surface of said wall, said opening and insulator portion next adjacent thereto being of such cooperating configuration that the bushing is held against turning as said clamping nut is tightened, and a plurality of notches in the outer surface of said clamping nut for the reception of a tool so that said nut may be kept tight to maintain suitable pressure so as to provide a substantially liquid-tight seal between said gasket and the cooperating surfaces.

EDWARD D. TREANOR.